March 11, 1969   G. O. KUNZ   3,432,190
CLAMP-TYPE HOSE FITTING
Filed Nov. 30, 1966

INVENTOR
GUENTER OTTO KUNZ
BY Jerry K. Harness
his ATTORNEY

United States Patent Office 3,432,190
Patented Mar. 11, 1969

3,432,190
CLAMP-TYPE HOSE FITTING
Guenter Otto Kunz, Jackson, Mich., assignor to
Aeroquip Corporation, Jackson, Mich.
Filed Nov. 30, 1966, Ser. No. 597,991
U.S. Cl. 285—253
Int. Cl. F16l 33/00
1 Claim

ABSTRACT OF THE DISCLOSURE

A split clamp hose fitting including complementary half sections, each having a solid longitudinally extending tongue on one side which mates with a recess on the other to eliminate extrusion of the outer cover of the hose and to provide 360° of radial compression and to thereby improve the sealing characteristics.

---

Figure 1:
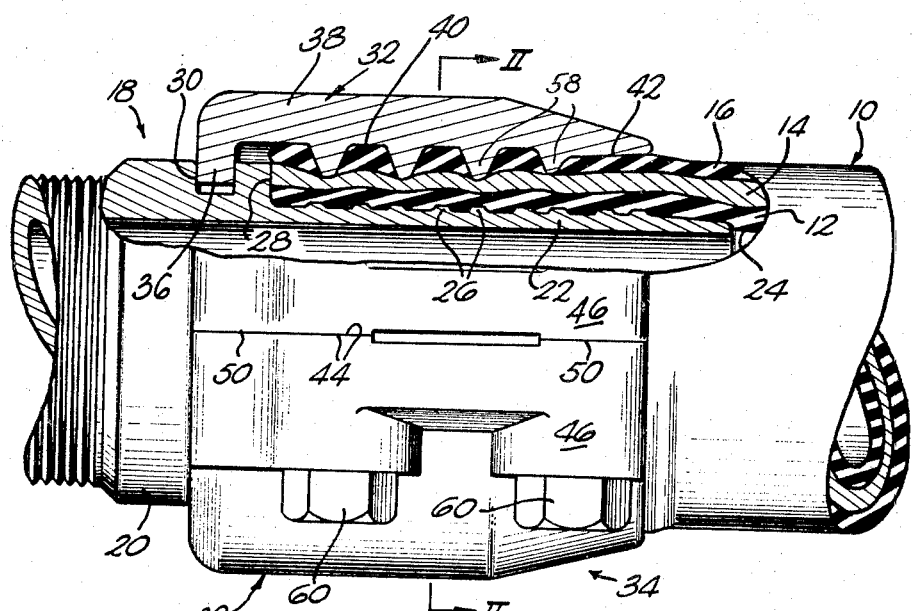

The invention pertains to a hose fitting of the type utilizing a nipple received within the bore of the hose and a socket encompassing the outer surface of the hose adapted to clamp the hose upon the nipple. In particular, the invention pertains to hose fittings of the aforedescribed type wherein the socket is formed of a plurality of interconnected segments.

In order to facilitate the attachment of hose fittings, particularly those of the reusable type, to flexible hose of relative large diameter such as hose having an outer diameter greater than 1½ inches, it is known to form the socket from a plurality of interconnected segments which may be bolted, banded, or otherwise assembled to form an annular socket capable of compressing the hose in the region of the fitting nipple.

Hose fittings of conventional nature utilizing segmented sockets have the disadvantage of failing to produce uniform circumferential and radial compression forces on hose formed of deformable material, such as rubber or the like. Uneven forces are produced in the hose due to the tendency for the hose to deform during the tightening of the interconnection between the socket segments. The socket segments usually include a substantially cylindrical surface adapted to engage the hose outer surface or covering. This surface is circumferentially defined by radially extending edges. The opposed edges of the socket segments are in a spaced relationship during the initial stages of interconnection of the segments, and the hose material tends to be radially deflected between the opposed segment edges as compression forces are placed upon the hose during tightening of the segment interconnection means. The resultant hose configuration is somewhat elliptical, in that little or no radial forces are imposed upon the hose at the region adjacent the segment radial edges. Thus, nonuniform compression of the hose results with the attendant likelihood of the formation of stress points and weaknesses in the sealing and clamping characteristics of the fitting.

It is an object of the invention to provide a hose fitting using a segmented socket constructed wherein the segments are of such construction as to provide an equal distribution of compression forces on the hose by the socket, and eliminate deformation of the hose from a cylindrical configuration while clamped between a nipple and a segmented socket.

Another object of the invention is to provide a hose fitting employing a segmented socket construction wherein a tongue is employed to confine a portion of the hose located within the fitting socket and the presence of such a tongue does not adversely affect the assembly procedure and permits uniform radial and circumferential forces to be imposed upon the hose by the socket.

Another object of the invention is to provide a hose fitting wherein the socket is of a segmented construction utilizing bolts to interconnect the socket segments and wherein limiting means are defined on the segments whereby interengagement of the limiting means indicates the completion of the socket assembly and prevents overcompression of the hose.

A further object of the invention is to provide a hose fitting employing a segmented socket construction wherein the hose is confined throughout 360° of its circumference by the socket, and wherein a tongue and recess construction is employed between adjacent segments which does not require additional components other than the segments themselves.

Figure 2:
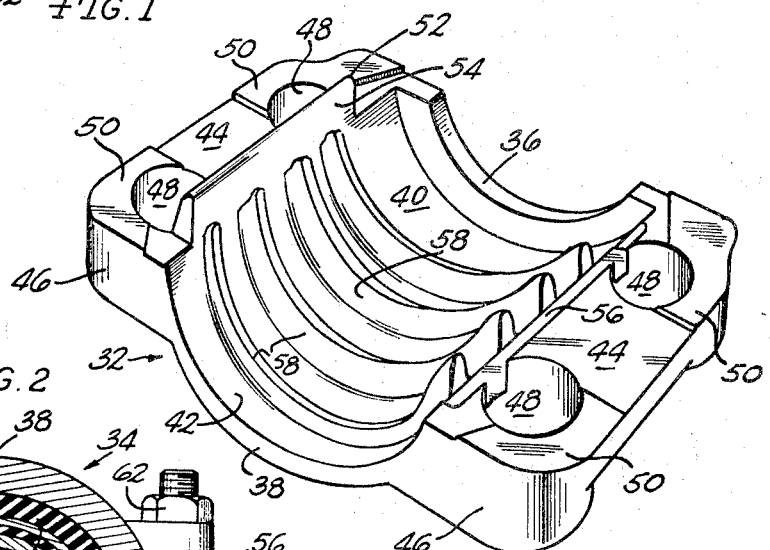
Figure 3:
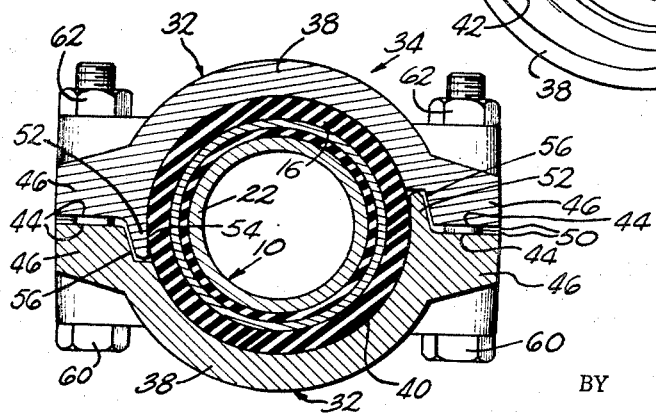

These and other objects of the invention arising from the details and relationships of the components of an embodiment thereof will be apparent from the following description and accompanying drawings wherein:

FIG. 1 is an elevational view, partially diametrically sectioned, illustrating a hose fitting in accord with the invention in the assembled relationship, FIG. 2 is an elevational, sectional view taken along section II—II of FIG. 1, and FIG. 3 is a perspective view of the inside of a socket segment in accord with the invention.

In FIG. 1 the relationship of the hose fitting components utilizing the invention will be appreciated. The hose 10 is of a typical construction utilizing an inner tube 12 of a rubber or plastic deformable material encased within a wire reinforcement sheath 14. The hose outer cover 16 is also of a rubber or synthetic deformable material which protects the wire reinforcement and forms and outer portion of the hose.

The fitting 18 includes a body having an outer portion 20 which is threaded for cooperation with conventional plumbing fixtures. The inner end of the fitting body forms a tubular nipple 22 adapted to be inserted into the bore 24 of the hose inner tube. The nipple 22 includes ribs or serrations 26 whereby an effective and frictional engagement between the nipple and inner tube 12 can be accomplished.

The illustrated fitting includes a radially extending shoulder 28 against which the end of the hose abuts. Also, wherein it is desired that the socket be fixed with respect to the nipple to prevent relative axial movement, as is the usual case, an annular groove 30 defined in the fitting body outer portion is employed for this purpose.

In the illustrated embodiment, the socket consists of a pair of identical segments 32. Each of the segments constitutes 180° of the complete socket 34 and the outer ends of the segments are each formed with an inwardly extending lip 36 which cooperates with the groove 30 in a radially sliding manner to axially locate and connect the segments with respect to the nipple.

The general cross-sectional configuration of the segments 32 will be appreciated from FIGS. 2 and 3, and includes a substantially cylindrical portion 38 having a cylindrical inner surface 40. The cylindrical surface 40 extends substantially the axial length of the associated segment and, in the illustrated embodiment, a cylindrical surface 42 of a slightly lesser radial dimension is located at the innermost end of the segment, FIG. 1.

The circumferential extent of the segment inner surfaces 40 and 42 is defined by radially extending edges 44. In a two-segment socket, as in the illustrated embodiment, the edges 44 of a common segment would lie in the same plane. However, if a three-segment socket were employed, the included angle between the planes of the edges of a common segment would be 120°, and if a four-segment socket were employed, the included angle between the segment edges would be 90°.

The segments 32 include outwardly extending flanges 46 upon which the edges 44 are defined. The flanges are provided with holes 48 perpendicularly related to the axis of the associated inner surface 40 for receiving the clamping bolts which interconnect the segments. The flanges 46 are provided with abutment lands or surfaces 50 which arise from the edges 44 a limited distance, normally less than ⅛ of an inch, which constitute the means for determining the final relationship of the segments during assembly.

The hose is confined in the region of the edges 44 by axially extending tongues 52 affixed to the segments and projecting from and above the edges 44. The tongues 52 include an inner surface 54 which is in substantial alignment with the associated portion of the cylindrical inner surface 40 to constitute an extension of the cylindrical inner surface. Thus, it will be appreciated that the tongue inner surface 54 is substantially tangential to the associated cylindrical inner surface 40, as will be apparent from FIGS. 2 and 3.

The axial length of the tongues 52 will be appreciated from FIG. 3 and, preferably, extend from a point near the lip 36 to alignment with the cylindrical surface 42.

In order to provide clearance for the segment tongues, a recess 56 is formed in the segments in the opposite edge 44. The recesses 56 are of an axial length slightly greater than those of the tongues and are of such configuration and dimension as to receive the tongue of the other segment without interfering therewith.

In order to increase the frictional engagement between the socket segments and hose, a plurality of circumferentially extending serrations or ribs 58 are defined on the segments radially extending inwardly from the inner surface 40. The serrations 58 are axially spaced from each other and the ends of the serrations occur adjacent the associated segment edges 44. As will be apparent from FIG. 3, the ends of the serrations may extend a slight distance onto the tongue inner surface 54. The serrations 58 occurring adjacent the segment recess 56 are substantially in the same plane as the adjacent edge 44 and will form a relationship with the recess which will be apparent from FIG. 3.

In operation, the end of the hose 10 is trimmed and the nipple 22 inserted into the inner tube bore 24 until the hose end engages with the shoulder 28. The segments 32 are then positioned on opposite sides of the hose wherein the lips 36 thereof are aligned and initially started into the groove 30. At this time the tongue 52 of the lower segment will be in opposed alignment with the recess 56 of the upper segment and vice versa. Bolts 60 are inserted through the holes 48 and nuts 62 affixed thereto. The nuts are then uniformly tightened on the bolts drawing the segments 32 toward each other. As the segments are pulled toward each other, the segment serrations 58 will embed into the outer hose cover 16 and the hose will be compressed by the serrations and the inner surfaces 40 and 42 of the segments. During this tightening operation, the usual segment construction would permit the hose material to radially extrude in the direction of the edges 44. However, due to the presence of the tongues 52 and the substantially tangential relationship of the tongue inner surface 54 to the configuration of the segment inner surface 40, such radial flow of the hose material is prevented, and the circular configuration of the hose will be maintained, as will be apparent in FIG. 2. As the segments 32 are drawn toward each other, the tongues 52 are received increasingly further into the recesses 56 and the nuts 62 will continue to be tightened until the opposing lands 50 engage with each other, as in FIG. 1. Upon the lands of the segments engaging, further contraction and assembly of the segments is prevented, and the installation of the hose fitting is completed.

As will be apparent from FIG. 2, the presence of the tongues 52 assures a uniform shape and compression of the hose material throughout its circumference, even though under significant radial and circumferential compression. Thus, optimum sealing and frictional engagement between the fitting and hose is attained. The ends of the serrations 58 of the segments will be opposed to each other upon completion of the assembly, FIG. 2, and, thus, the effectiveness of the serrations is maintained. The axial extent of the tongues 52 and the recesses 56 is such as to radially confine the hose over such an axial length as to produce optimum interconnection between the hose and fitting for the designed operating capabilities of the hose and fitting.

The employment of the abutment lands 50 prevents the hose from being unduly crushed under the influence of the socket segment compression and the operator will immediately sense when the lands of the interconnected segments engage due to the increase in the torque requirements at the nuts 62. It will be appreciated that with the invention there is no possibility that hose material would flow between the segments during tightening and, thus, interfere with the assembly of the segments, as is possible with more conventional segment constructions.

In the described embodiment, the segments 32 are of identical construction, thereby reducing inventory requirements. However, it will be appreciated that the invention could be practiced in a two-segment socket by providing one of the segments with two tongues and the other segment with two recesses. Likewise, the inventive principles may be employed with any segmented socket, regardless of the number of segments employed. In such multiple segment constructions above two, each segment would include a tongue and a recess.

It is appreciated that various modifications to the invention may be apparent to those skilled in the art without departing from the scope thereof.

What is claimed is:

1. A hose fitting adapted to be affixed to a hose having a bore and an outer surface and formed of a deformable material comprising, in combination, a nipple, said nipple including an axial portion adapted to be inserted into the hose bore and internally support said hose, a socket adapted to encompass said hose in axial alignment with said nipple axial portion, said socket comprising at least two interconnectible segments, each of said segments including a substantially cylindrical inner surface adapted to be disposed toward the hose outer surface and a pair of radially extending edges defining the circumferential extent of said inner surface, said segments adapted to be assembled whereby said segments together define an annular socket and an edge of one segment is disposed in opposed adjacent relation to an edge of the adjacent segment, an axially extending elongated solid tongue disposed adjacent one of said opposed edges and including an inner surface extending beyond the associated segment edge in the circumferential direction of the associated segment's inner surface and constituting a circumferential extension thereof, an axially extending elongated recess defined adjacent the other of said opposed segment edges in the associated segment thereof receiving said tongue, an abutment surface defined on each segment radial edge, the abutment surfaces of opposed edges being in opposed relationship whereby opposed abutment surfaces engage upon said segments being fully interconnected to indicate such condition, circumferentially extending axially spaced serrations defined on each of said segments radially extending inwardly of said segment's inner surface, said serrations including ends defined adjacent the radial edges of the associated segment, said segment ends being located adjacent the tongue inner surface of the tongue of a common segment and radially disposed inwardly of said associated tongue inner surface and defining one side of said recess, and means interconnecting said segments to compress said segments upon the hose, said tongue confining said hose against radial displacement in the region of said opposed edges to permit substantially 360° of uniform radial compression of said hose by said segments.

References Cited

UNITED STATES PATENTS

| | | | |
|---|---|---|---|
| 858,575 | 7/1907 | Chaflin | 285—253 X |
| 863,887 | 8/1907 | Stuttle | 285—373 |
| 1,599,775 | 9/1926 | Lamb et al. | 285—253 X |
| 2,690,193 | 9/1954 | Smith | 285—373 X |
| 3,181,900 | 5/1965 | Hayward | 285—243 |
| 3,249,371 | 5/1966 | Peterman | 285—253 |
| 3,367,683 | 2/1968 | Mattson | 285—243 |

FOREIGN PATENTS 966,398  8/1957  Germany.

THOMAS F. CALLAGHAN, *Primary Examiner.*

U.S. Cl. X.R.

285—259